(12) United States Patent
Lin et al.

(10) Patent No.: US 8,855,486 B2
(45) Date of Patent: Oct. 7, 2014

(54) REMOTELY CONTROLLED FIBER TESTING METHOD

(71) Applicant: Polarlink Technologies, Ltd., Kaohsiung (TW)

(72) Inventors: Shih-Tien Lin, Kaohsiung (TW); Fu-Chun Hung, Kaohsiung (TW); Yu-Shu Chen, Kaohsiung (TW); Ching-Wen Hsiao, Kaohsiung (TW); Chun-Hung Su, Kaohsiung (TW)

(73) Assignee: Polarlink Technologies, Ltd., Kaohsiung (TW)

( * ) Notice: Subject to any disclaimer, the term of this patent is extended or adjusted under 35 U.S.C. 154(b) by 70 days.

(21) Appl. No.: 13/711,808

(22) Filed: Dec. 12, 2012

(65) Prior Publication Data

US 2014/0161444 A1    Jun. 12, 2014

(51) Int. Cl.
*H04B 10/08* (2006.01)
*H04B 10/07* (2013.01)

(52) U.S. Cl.
CPC ........................... *H04B 10/07* (2013.01)
USPC ................... 398/28; 398/30; 398/32; 398/33; 398/16

(58) Field of Classification Search
CPC .... H04B 10/07; H04B 10/075; H04B 10/073; H04B 1/0705; H04B 10/0775; H04B 2210/078; H04B 2210/074; H04B 10/0773; H04B 10/0777; H04B 10/035; H04B 10/077; H04B 2210/075; H04B 2210/071
USPC .......................... 398/16, 30–33, 28
See application file for complete search history.

(56) References Cited

U.S. PATENT DOCUMENTS

| | | | | |
|---|---|---|---|---|
| 4,994,675 A * | 2/1991 | Levin et al. | ................... | 250/551 |
| 5,615,034 A * | 3/1997 | Hori | .............................. | 398/158 |
| 6,556,325 B1 * | 4/2003 | Horiuchi et al. | .............. | 398/177 |
| 6,721,086 B2 * | 4/2004 | Emberty et al. | .............. | 359/325 |
| 6,804,469 B2 * | 10/2004 | Kasahara et al. | ............. | 398/177 |
| 6,807,370 B2 * | 10/2004 | Harasawa | ....................... | 398/13 |
| 7,356,127 B2 * | 4/2008 | Peduzzi et al. | ............... | 379/1.03 |
| 7,756,418 B2 * | 7/2010 | Ofalt et al. | ...................... | 398/25 |
| 7,792,425 B2 * | 9/2010 | Aronson et al. | ................ | 398/30 |
| 8,090,258 B2 * | 1/2012 | DeLew et al. | ................... | 398/22 |
| 8,452,174 B2 * | 5/2013 | Xia et al. | ........................ | 398/29 |
| 2005/0031342 A1 * | 2/2005 | Wu et al. | ......................... | 398/32 |
| 2009/0116845 A1 * | 5/2009 | Li et al. | .......................... | 398/135 |
| 2011/0013904 A1 * | 1/2011 | Khermosh et al. | ............. | 398/16 |
| 2014/0072298 A1 * | 3/2014 | Hou | ................................. | 398/16 |
| 2014/0126901 A1 * | 5/2014 | Campanelli et al. | ........... | 398/16 |

* cited by examiner

*Primary Examiner* — Daniel Washburn
*Assistant Examiner* — Hibret Woldekidan
(74) *Attorney, Agent, or Firm* — Alan Kamrath; Kamrath IP Lawfirm, P.A.

(57) ABSTRACT

A remotely controlled fiber testing method has the steps of: building a fiber network system including a local fiber station and a remote fiber station; sending a modulated signal to the remote fiber station by the local fiber station; demodulating the modulated signal to obtain a control command by the remote fiber station; executing the control command to obtain a testing result by the remote fiber station; modulating the testing result and sending the testing result back to the local fiber station; and demodulating the testing result by the local fiber station. Only one technician appointed to the local fiber station is sufficient to do the testing action. Therefore, the personnel cost is effectively reduced.

1 Claim, 7 Drawing Sheets

REMOTELY CONTROLLED FIBER TESTING METHOD

BACKGROUND OF THE INVENTION

1. Field of the Invention

The present invention relates to a fiber testing method and, more particularly, to a remotely controlled fiber testing method.

2. Description of Related Art

Presently, a fiber network system is composed of multiple fiber stations. The fiber stations are not directly connected to each other. There may be multiple splitting nodes distributed among different fiber stations. To confirm the communicating quality among the fiber stations, quality testing is necessary.

For example, a first fiber station is set at a first position. A second fiber station is set at a second position separated from the first fiber station by a distance. Technicians go to the fiber stations in person for executing the testing action. The technicians in different positions communicate with each other by additional communication devices, such as mobile phones or wireless network, instead of using the fiber network system.

The first fiber station is controlled by a first technician to send a test signal to the second fiber station. When the second fiber station receives the test signal, the second fiber station generates a testing result according to the test signal. A second technician in the second fiber station reports the testing result to the first technician by a mobile phone to finish the testing action. The following paragraphs describe how the test signal and the testing result work.

With reference to FIG. 6, a conventional fiber network system comprises a first fiber station 20 and a second fiber station 21. The first fiber station 20 acts as a beginning station of the fiber network system. The second fiber station 21 acts as an end station of the fiber network system. The first fiber station 20 is connected to the second fiber station 21 through two splitting nodes 22.

The first fiber station 20 has a fiber testing device. When the first fiber station 20 executes the testing action, the fiber testing device sends a modulated signal as the test signal outward. The modulated signal includes at least one control command, i.e. a control command for detecting fiber loss or for determining an event position.

After the fiber testing device sends out the modulated signal, the fiber testing device of the first fiber station 20 then correspondingly receives a response signal. The fiber testing device demodulates the response signal to obtain the testing result as illustrated in FIG. 7.

With reference to FIG. 7, a first attenuation of 9 dB occurs at one splitting node 22 close to the second fiber station 21. A second attenuation of 6 dB occurs at the other splitting node 22. The attenuations respectively correspond to the splitting nodes 22. According to the testing result, the technician can analyze the testing result, i.e. determining the distance between the splitting nodes 22, the signal attenuation and a transmission distance of the response signal.

However, when the fiber stations are widely distributed, appointing technicians to the multiple fiber stations causes high personnel cost. Also, when the fiber stations lack additional communication devices, the technicians in different fiber stations cannot communicate with each other. As a result, the testing action cannot be effectively implemented.

Furthermore, the testing result may not be successfully transmitted to the first fiber station 20 because of the attenuations resulting from the splitting nodes 22 and the long distance between the first and second fiber stations 20, 21.

Hence, the technician in the first fiber station 20 cannot confirm the fiber connection between the first fiber station 20 and the second fiber station 21.

SUMMARY OF THE INVENTION

An objective of the present invention is to provide a remotely controlled fiber testing method. The fiber stations in a fiber network system can automatically complete the testing action.

The remotely controlled fiber testing method of the invention comprises the steps of:

building a fiber network system having multiple fiber stations including a local fiber station and a remote fiber station;

sending a modulated signal from the local fiber station to the remote fiber station, with the modulated signal containing a control command;

demodulating the modulated signal to obtain the control command by the remote fiber station;

executing the control command to obtain a testing result by the remote fiber station;

modulating the testing result and sending the testing result back to the local fiber station by the remote fiber station; and demodulating the testing result by the local fiber station.

The modulated signal is transmitted from the local fiber station to the remote fiber station. The remote fiber station then correspondingly returns the testing result to the local fiber station to accomplish the testing action. Hence, only one technician in the local fiber station is sufficient to effectively execute the testing action, eliminating the need to appoint extra technicians to the remote fiber stations, such that the method of the invention reduces personnel cost. In addition, by demodulating the modulated signals via the fiber network, no additional communication device is needed for the technician to execute the testing action.

DETAILED DESCRIPTION OF THE PREFERRED EMBODIMENTS

Figure 1:
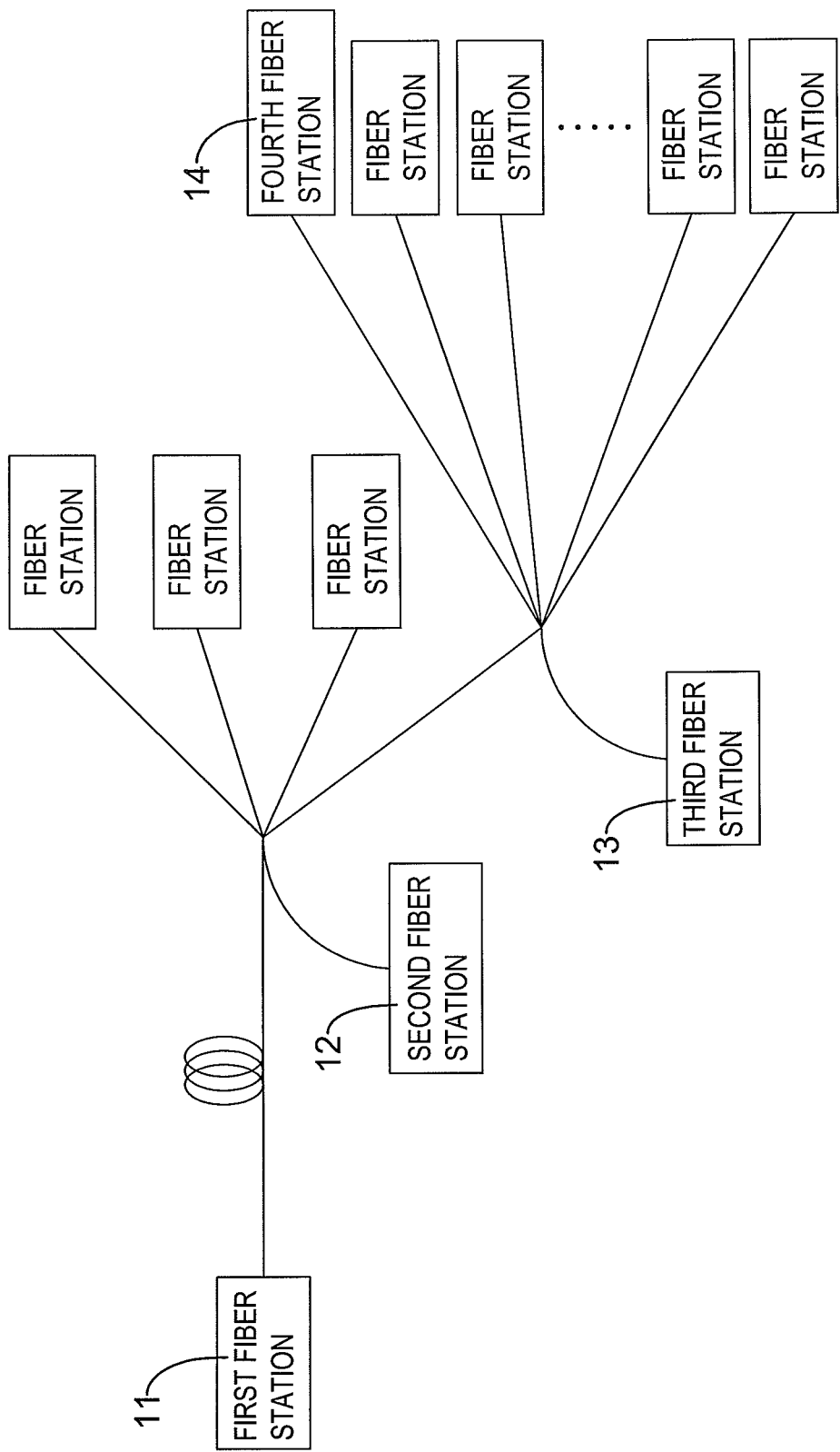
FIG. 1 is a block diagram of a fiber network system.

With reference to FIG. 1, a fiber network system of a first embodiment of the invention is disclosed. The fiber network system comprises multiple fiber stations including a first fiber station 11, a second fiber station 12, a third fiber station 13 and a fourth fiber station 14 connected by fiber cables. The first fiber station 11 can act as a root. The other fiber stations, acting as branches, are connected to the first fiber station 11 to form a complete network structure. For example, the first fiber station 11, the second fiber station 12 and the third fiber station 13 can be set in a server room. The fourth fiber station 14 can be set in a client's place, such as an apartment.

In this embodiment, each fiber station 11-14 has a fiber testing device. The second fiber station 12 and the third fiber station 13 respectively have a fiber splitter for splitting one beam of optical fiber light into several parts. With reference to FIG. 1, for example, the second fiber station 12 has a 1×4 fiber splitter. An input terminal of the 1×4 fiber splitter is connected to the first fiber station 11. The third fiber station 13 has a 1×8 fiber splitter. An input terminal of the 1×8 fiber splitter is connected to the second fiber station 12. An output terminal of the 1×8 fiber splitter is connected to the fourth fiber station 14.

A technician works in any one of the fiber stations 11-14 to execute a testing action. Any fiber station 11-14 in which the technician works is regarded as a local fiber station. The local fiber station is controlled to execute the testing action. For example, when the technician works in the first fiber station 11, the first fiber station 11 acts as the local fiber station. The other fiber stations 12-14 act as remote fiber stations.

Figure 2:
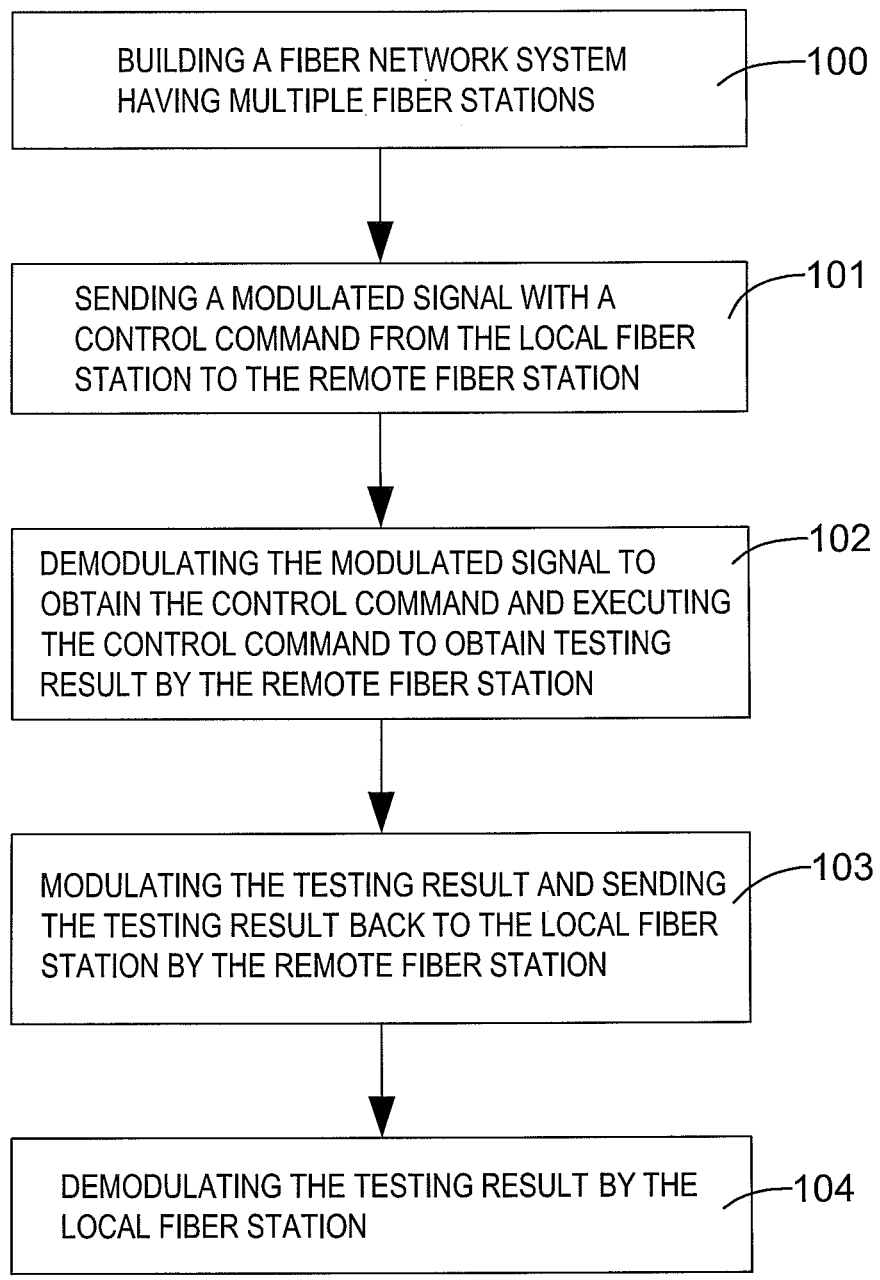
FIG. 2 is a flow chart of an embodiment of the invention.

With reference to FIG. 2, a flow chart of the method of the invention is disclosed. A first step of the invention is to build a fiber network system including multiple fiber stations, with each fiber station having a fiber testing device (step 100).

After the fiber network system is built, the local fiber station, i.e. the first fiber station 11, sends a modulated signal to the fiber testing device of one remote fiber station of interest, for example, the second fiber station 12, with the modulated signal containing a control command (step 101).

When the fiber testing device of the second fiber station 12 receives the modulated signal, the second fiber station 12 demodulates the modulated signal to obtain the control command and executes the control command to obtain a testing result (step 102).

When the second fiber station 12 obtains the testing result, the second fiber station 12 modulates the testing result and sends the testing result back to the fiber testing device of the first fiber station 11 (step 103).

When the first fiber station 11 receives the testing result from the second fiber station 12, the first fiber station 11 demodulates the testing result (step 104). The technician in the first fiber station 11 can analyze the testing result to confirm the quality of the fiber network system.

Figure 3:
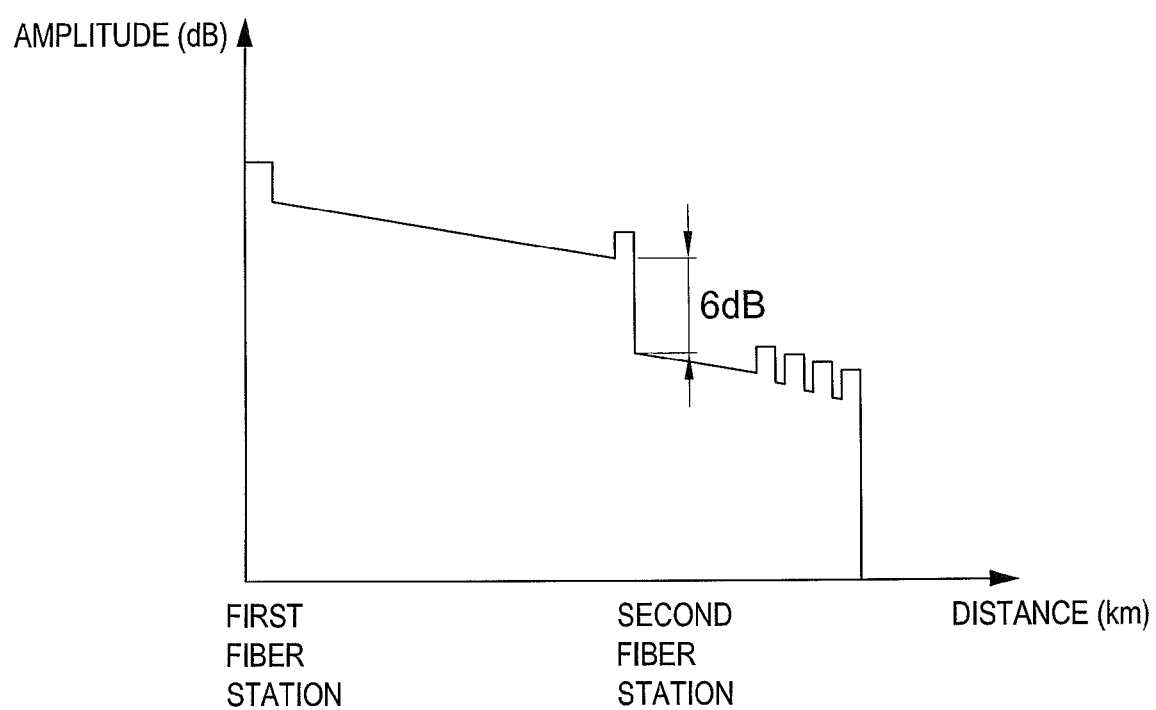
FIG. 3 is a testing result diagram with the first fiber station acting as the local fiber station.

With reference to FIG. 3, a wave diagram of the testing result received by the first fiber station 11 from the second fiber station 12 is disclosed. The wave diagram shows information of a distance between the first fiber station 11 and the second fiber station 12, a fiber split number of the second fiber station 12 and the signal attenuation of the second fiber station 12. An attenuation of 6 dB occurs at the second fiber station 12.

Figure 4:
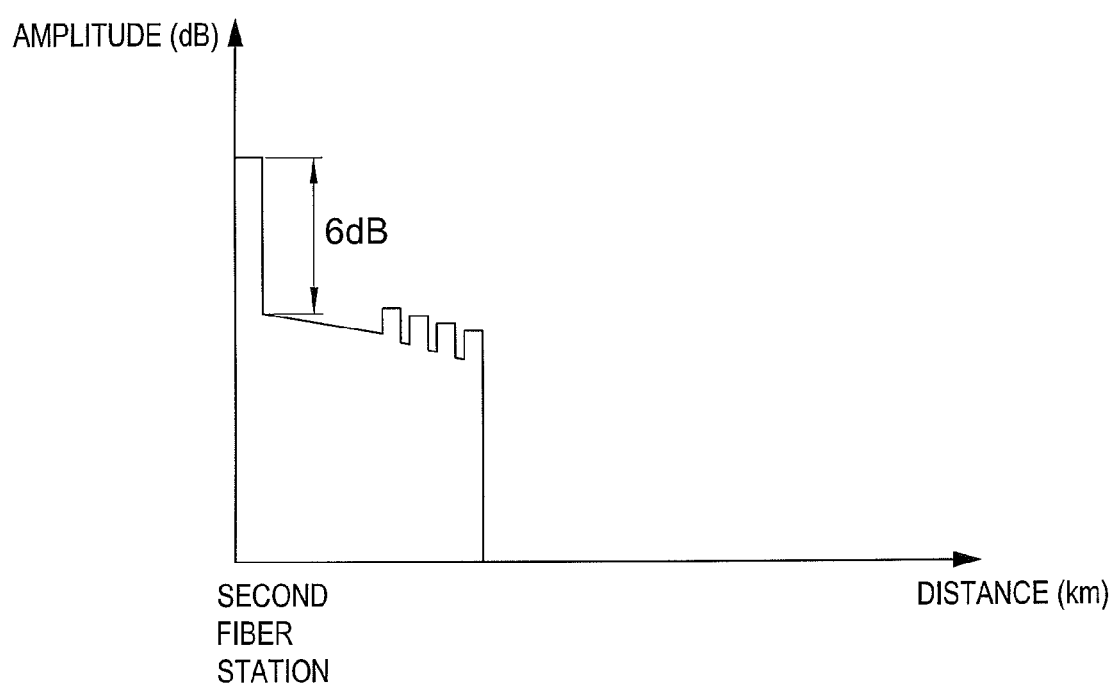
FIG. 4 is a testing result diagram with the second fiber station acting as the local fiber station.
Figure 5:
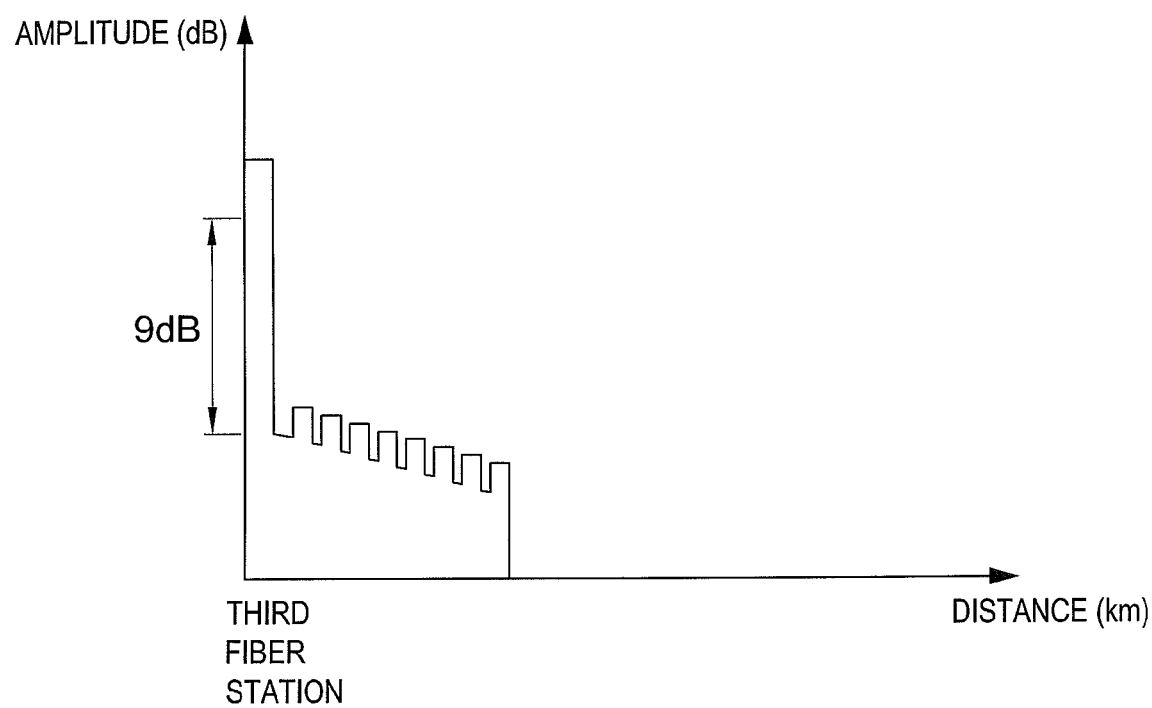
FIG. 5 is a testing result diagram with the third fiber station acting as the local fiber station.
Figure 6:
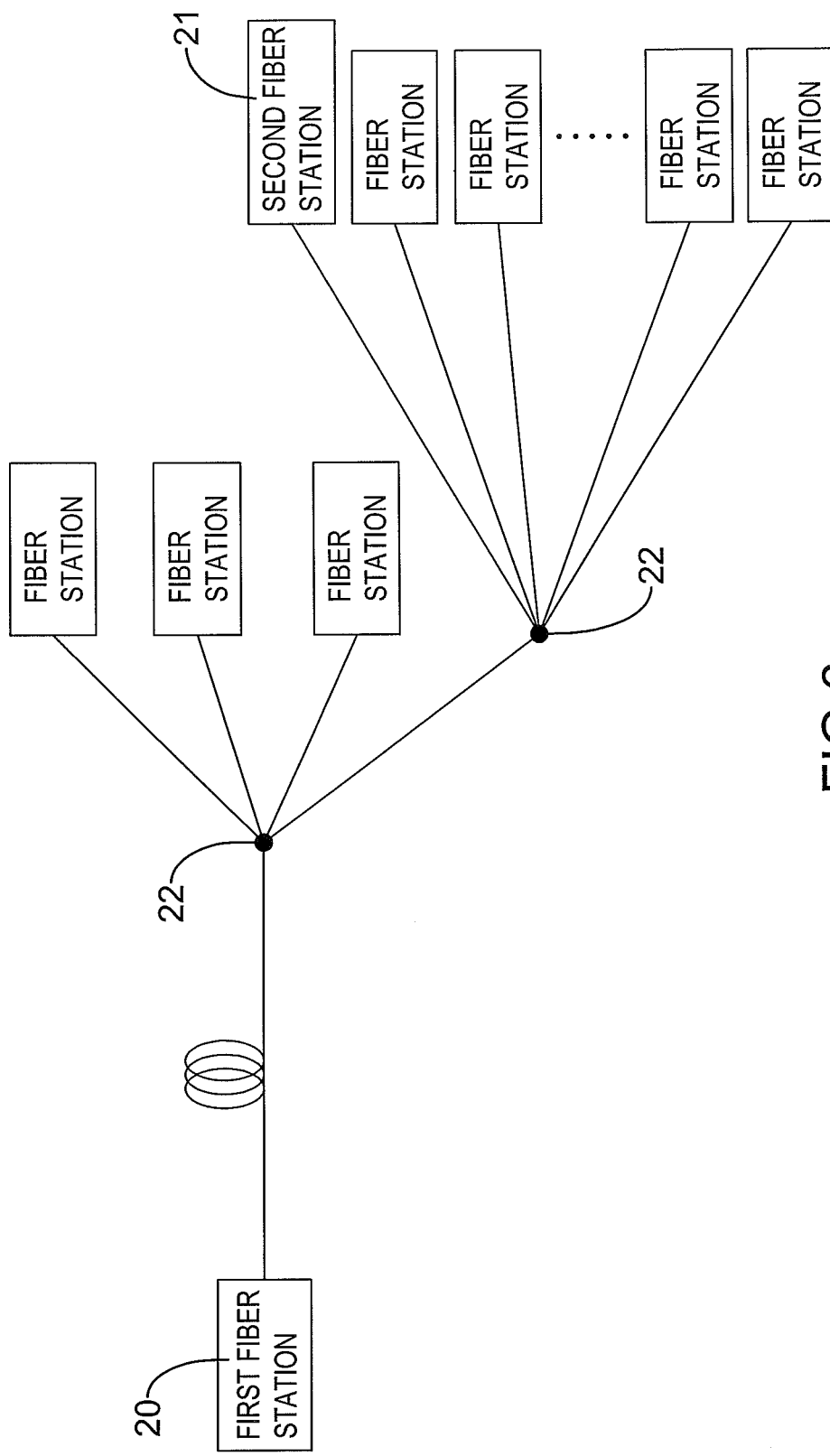
FIG. 6 is a block diagram of a conventional fiber network system.
Figure 7:
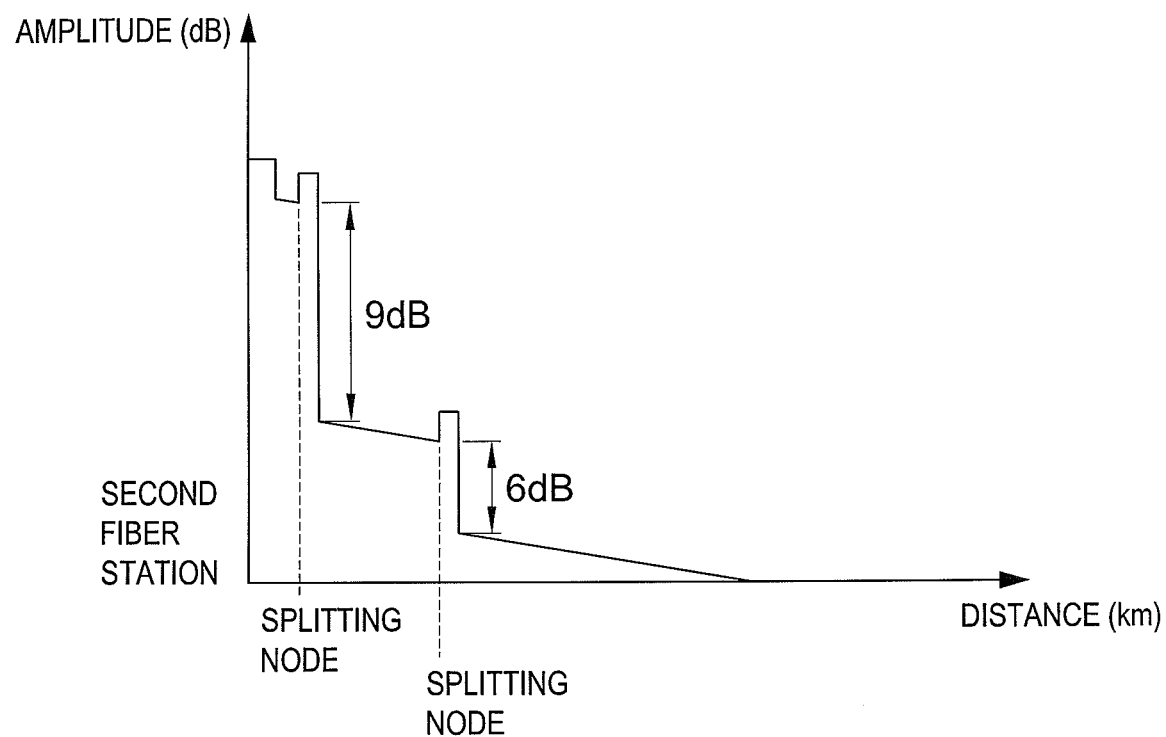
FIG. 7 is a response signal diagram of a conventional terminal fiber station.

Alternatively, the second fiber station 12 can act as the local fiber station while the other fiber stations 11, 13, 14 act as remote fiber stations. With reference to FIG. 4, the second fiber station 12 has a 1×4 fiber splitter, and the signal attenuation of the second fiber station 12 is approximately 6 dB. Similarly, the third fiber station 13 can act as the local fiber station, while the other fiber stations 11, 12, 14 act as remote fiber stations. With reference to FIG. 5, the third fiber station 13 has a 1×8 fiber splitter, and the signal attenuation of the third fiber station 13 is approximately 9 dB.

When the technician in the fourth fiber station 14 wants to confirm the fiber connection between the fourth fiber station 14 and the first fiber station 11, the testing result generated from the first fiber station 11 may not reach the fourth fiber station 14 due to a long distance between the two fiber stations 11, 14. In order to overcome such problem, the method of the invention executes not only the testing action between two adjacent fiber stations, but also the testing action among two fiber stations remotely separated from each other. For example, when the fourth fiber station 14 acts as the local fiber station and when the first fiber station 11 acts as the remote fiber station, the other fiber stations, i.e. the second fiber station 12 and the third fiber station 13, act as intermediate stations.

The fourth fiber station 14 sends a modulated signal to the intermediate stations. When the intermediate stations 12, 13 receive the modulated signal, the intermediate stations demodulate the modulated signal to obtain the control command. According to the control command, the intermediate stations send a second modulated signal with a second control command to the first fiber station 11. When the first fiber station 11 receives the second modulated signal from the intermediate stations, the first fiber station 11 demodulates the second modulated signal to obtain the control command and execute the control command to generate the testing result. After the first fiber station 11 generates the testing result, the first fiber station 11 modulates the testing result and sends the testing result to the fourth fiber station 14 through the intermediate stations. When the fourth fiber station 14 receives the testing result, the fourth station 14 demodulates the testing result such that the technician in the fourth fiber station 14 can analyze the testing result.

In conclusion, only one technician appointed to the local fiber station is sufficient to analyze the communicating quality through the method of the invention. The objective of remotely testing the fiber network system is then accomplished.

What is claimed is:

1. A remotely controlled fiber testing method comprising:
   building a fiber network system having multiple fiber stations including a local fiber station and a remote fiber station;
   sending a modulated signal containing a control command signal from the local fiber station to the remote fiber station;
   demodulating the modulated signal to obtain the control command by the remote fiber station;
   executing the control command to obtain a testing result by the remote fiber station;
   modulating the testing result and sending the testing result back to the local fiber station; and demodulating the testing result to finish a testing action by the local fiber station, wherein the local fiber station sends the modulated signal to the remote fiber station through at least one intermediate fiber station, and wherein the intermediate fiber station executes:
   receiving and demodulating the modulated signal from the local fiber station to obtain the control command; and
   executing the control command to send a second modulated signal with a second control command to the remote fiber station;
   when the remote fiber station receives the second control command from the intermediate fiber station, the remote fiber station obtains the testing result according to the second control command and modulates and sends the testing result back to the local fiber station; and
   when the local fiber station receives the testing result from the intermediate fiber station, the local fiber station demodulates the testing result.

* * * * *